United States Patent [19]

Plesh, Sr.

[11] Patent Number: 5,265,711

[45] Date of Patent: Nov. 30, 1993

[54] PLATE TRANSFER GRID FOR COOLING BED

[76] Inventor: Ronald L. Plesh, Sr., 31 Hemlock Hill, Orchard Park, N.Y. 14127

[21] Appl. No.: 867,040

[22] Filed: Apr. 10, 1992

[51] Int. Cl.⁵ .............................................. B65G 13/00
[52] U.S. Cl. .................................................... 193/35 R
[58] Field of Search ............. 198/721, 615; 193/35 R, 193/37; 72/251

[56] References Cited

U.S. PATENT DOCUMENTS

| | | | |
|---|---|---|---|
| 1,676,011 | 7/1928 | Evans | 198/721 |
| 2,172,379 | 9/1939 | Harris | 193/35 R |
| 3,509,978 | 5/1970 | Bedford | 193/35 R |
| 4,044,585 | 8/1977 | Buchheit | 72/201 |
| 4,554,813 | 11/1985 | Feldmann et al. | 72/251 |
| 4,945,746 | 8/1990 | Jakimowicz et al. | 72/251 |
| 5,090,547 | 2/1992 | Schafer | 193/35 R |

*Primary Examiner*—Joseph E. Valenza
*Attorney, Agent, or Firm*—Hodgson, Russ, Andrews, Woods & Goodyear

[57] ABSTRACT

An insert to be removably and replaceably mounted in a pocket of a plate transfer grid for a cooling bed. The insert supports a roller to project above the members of the grid to engage plates for movement along the grid so as to reduce transfer grid wear and marring of the plates.

13 Claims, 3 Drawing Sheets

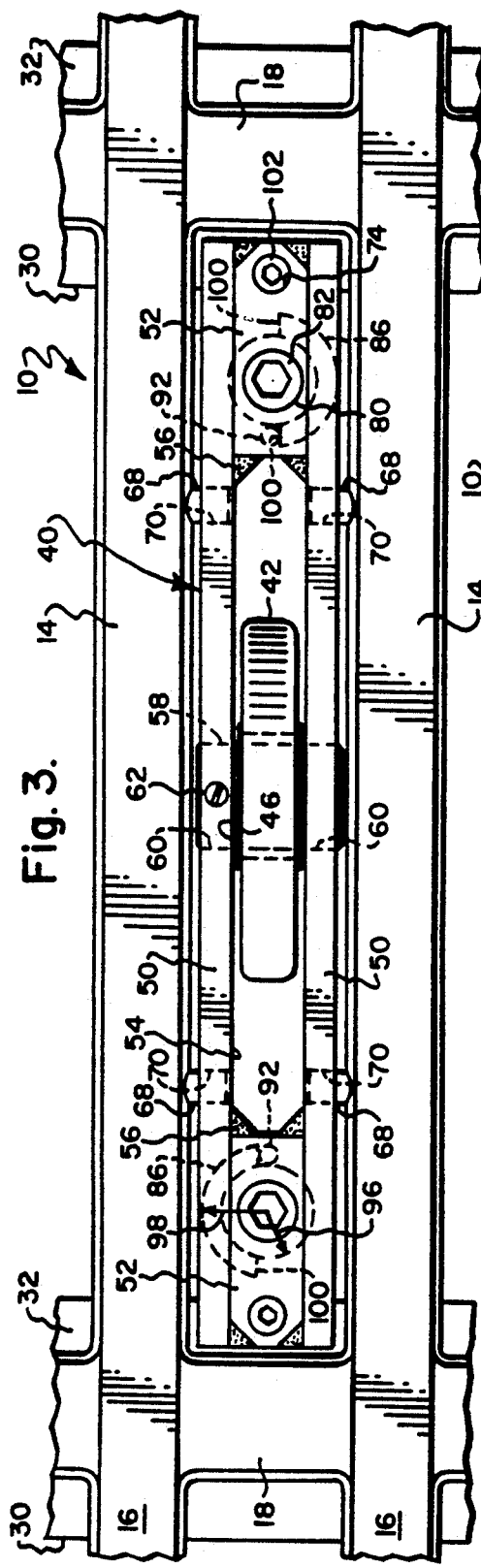

PLATE TRANSFER GRID FOR COOLING BED

The present invention relates generally to transfer grids for ferrous and non-ferrous metal plates and the like.

When initially formed in a plate mill, metal plates are very hot and must be suitably cooled before further processing. The plates may typically be up to 210 inches wide, and/or 150 feet long, and/or 10 inches thick. A cooling bed is typically provided over which the plates are slid by the use of chains (pusher dogs). The bed is constructed to allow plentiful air circulation to the plates for cooling thereof as they traverse the length of the cooling bed over a period of perhaps 2 or 3 hours.

In a typical installation, the cooling bed may have a length of perhaps 150 feet or more and a width of perhaps 150 feet or more to accommodate the very large plates.

Patents which are of interest in showing the use of rollers for effecting entry of plates onto a cooling bed are U.S. Pat. Nos. 4,044,585 to Buchheit and 4,554,813 to Feldmann et al.

A cooling bed is typically composed of a plurality of transfer grids each being cast as a single piece. Each grid may typically be about 12 feet long and 8 feet wide. A transfer grid typically comprises a plurality of parallel portions or members extending in the direction of travel, and the metal plates are transferred by movement manually along the length thereof while engaging the upper surfaces thereof. These plate engaging members are joined by integral cross-portions or cross-members which extend across the grid width at right angles thereto, the plate engaging members projecting above the cross-members.

The movement of the metal plates over the grid surfaces undesirably causes wear thereof requiring relatively frequent replacement of the grids and such replacement is costly. In addition, the under surfaces of the plates may be marred as they are conveyed along the grid members.

Runout tables have been provided which are constructed to have side-by-side rollers over which the metal plates travel during cooling. These rollers are supported at their ends and extend generally over the entire width of the runout table. See, for example, U.S. Pat. No. 4,945,746 to Jakimowicz et al. Other cooling beds have been provided which have side-by-side bars which lift and move forward perhaps 2 feet for movement of a plate then retract down and back to the starting point to again move the plate forward. Both of these types of cooling beds are very expensive to build. However, these cooling beds do not have the wear problems associated with the cast transfer grids, and the plates are generally not marred. Many customers are now demanding that the product not be marred. To maintain customer satisfaction so as to remain competitive, it is necessary to provide the capital outlay for an expensive replacement cooling bed or to modify an existing cooling bed with the transfer grids so that marring of the plates is suitably reduced.

It is accordingly an object of the present invention to retrofit existing transfer grids so as to reduce marring of metal plates which are transferred thereby as well as to reduce transfer grid wear.

It is another object of the present invention to provide such retrofitting inexpensively yet ruggedly.

It is a further object of the present invention to provide such a retrofit which can be maintained inexpensively.

It is yet another object of the present invention to provide low maintenance long lasting transfer grids inexpensively which can transfer plates with reduced marring.

In order to reduce marring of the metal plates as well as reduce grid wear, in accordance with the present invention, inserts having rollers which project above the grid surfaces are provided in pockets defined by adjacent plate engaging members and cross-members, for reducing or eliminating frictional sliding contact with the plate engaging members.

The above and other objects, features, and advantages of the present invention will be apparent in the following detailed description of the preferred embodiments thereof when read in conjunction with the accompanying drawings wherein like reference numerals denote the same or similar parts throughout the several views.

BRIEF DESCRIPTION OF THE DRAWINGS

FIG. 3 is an enlarged plan view of one of the inserts of FIG. 1 mounted in a transfer grid similar to that of FIG. 1.

FIG. 4 is a side elevation view, partly in section, of the insert of FIG. 3.

DETAILED DESCRIPTION OF THE PREFERRED EMBODIMENTS

Figure 1:
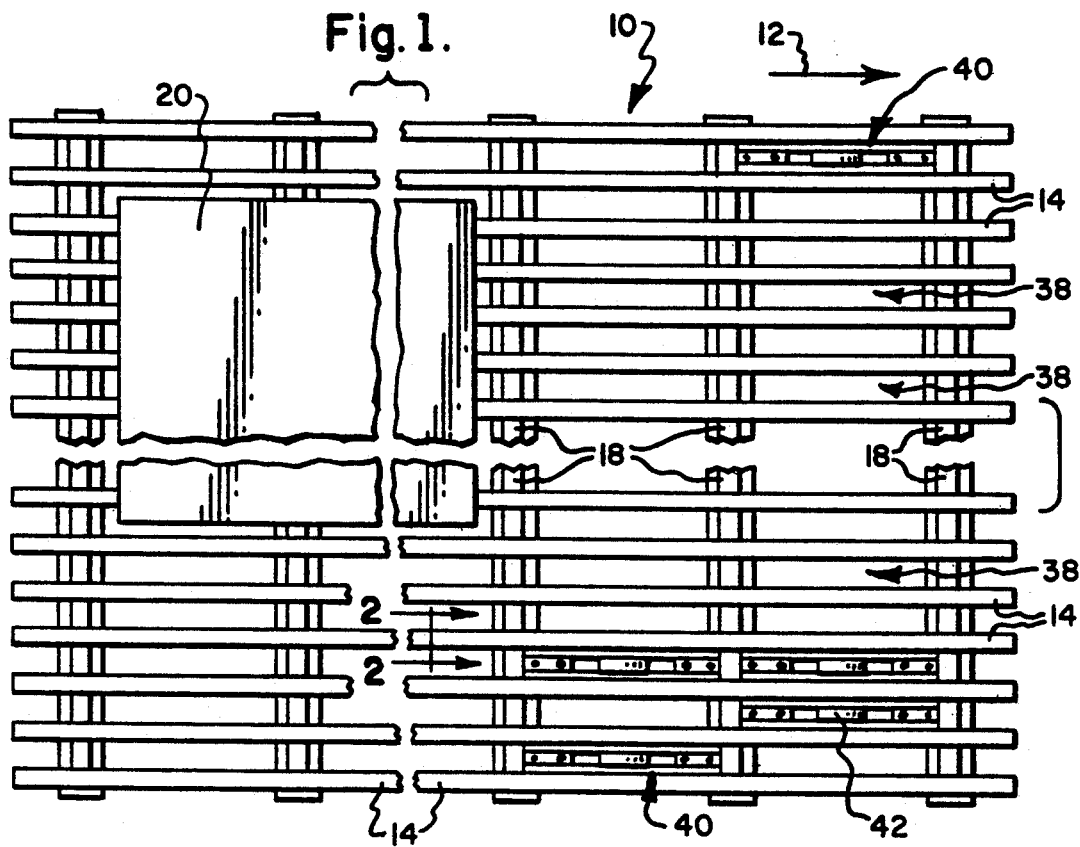
FIG. 1 is a plan view of a cooling bed transfer grid, including some roller inserts, which embodies the present invention.
Figure 2:
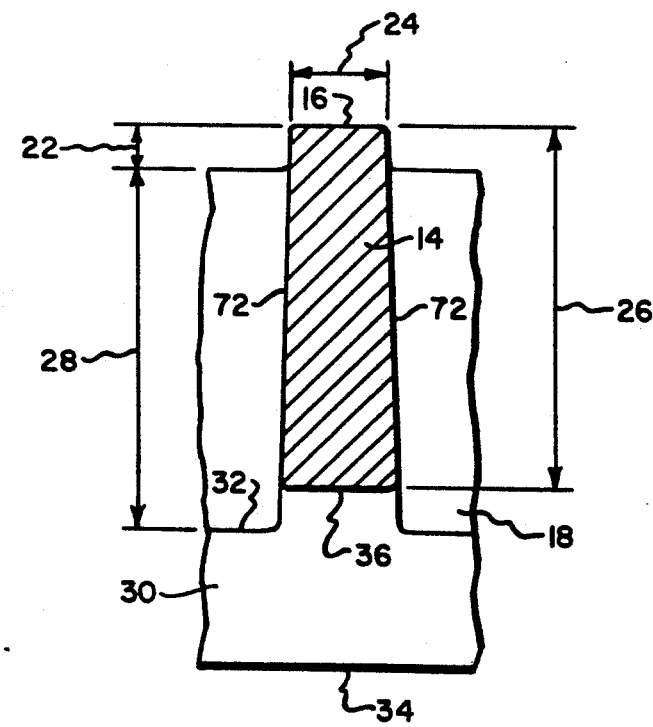
FIG. 2 is an enlarged vertical sectional view of a portion of the transfer grid of FIG. 1, taken along lines 2—2 thereof.

Referring to FIGS. 1 and 2, there is illustrated generally at 10 a grid which with a plurality of like grids forms a cooling bed for transferring hot ferrous and non-ferrous metal plates, illustrated at 20, in the direction of travel illustrated at 12 and for cooling them by air circulation and the passage of time as they are moved therealong such as by chains or the like. The transfer grid 10 is cast or fabricated as a weldment or otherwise suitably constructed in a single piece of iron or other suitable material and includes a plurality of first parallel portions or members 14 extending in the direction of travel 12 and providing upper surfaces 16 which, without the inserts described hereinafter, frictionally engage the metal plates 20 for sliding movement of the metal plates therealong. The members 14 are supportedly joined by cross-portions or cross-members 18 which extend at right angles thereto. The members 14 project above the cross-members 18 a distance illustrated at 22 of perhaps about ½ inch to provide the supporting surfaces 16 receiving the plates 20 and along which the plates are conveyed from left to right, as seen in FIG. 1, in the direction illustrated at 12. This distance could be reduced by wear to zero. The grid 10 may have a length of perhaps about 12 feet and a width of perhaps about 8 feet. Members 14 may have a upper surface width, illustrated at 24, of perhaps about 1¼ inch and have a height, illustrated at 26, of perhaps about 4 inches. The height, illustrated at 28, of the cross-members 18 may also be perhaps 4 inches. As best seen in FIG. 4, the lower portions of the cross-members 18 are sometimes flanged to provide lower flanges 30 having upper and lower surfaces 32 and 34 respectively, the upper surface 32 being below the lower surface 36 of the members 14. Members 14 and 18 are slightly tapered, as illustrated at 72, so as to have a greater thickness at the bottom surfaces thereof. The space bounded by a pair of members 14 and a pair of cross-members 18, which is generally rectangular, defines a pocket, illustrated at 38. The transfer grid 10 as so far described is of a type which is conventional in the art and will therefore not be described in any greater detail herein.

The frictional sliding movement of the metal plates 20 over the surfaces 16 of the members 14 causes wear thereof with the result that frequent replacement of the entire transfer grid is typically required at high cost. In addition, the under surface of the plates 20 may undesirably be marred as they are conveyed along the grid members 14. In order to reduce such wear and marring, in accordance with the present invention a plurality of inserts, illustrated generally at 40, providing rollers 42, are mounted in the pockets 38 as hereinafter described. The inserts 40 are fitted within the pockets 38 so that the rollers 42 project above the upper grid surfaces 16 a distance, illustrated at 44, which, along with other inserts 40 similarly positioned in other pockets, will support the plates 20 above the grid surfaces 16 as the plates move along the cooling bed to thus eliminate or reduce the sliding friction of the plates against the surfaces 16. This distance 44 is preferably between about 0.12 and 0.62 inch. For example, this distance 44 is perhaps about 0.25 inch. While it may not be necessary to provide an insert 40 in every single pocket 38, enough inserts 40 are preferably provided so that the plates 20 are suitably received on the rollers 42 to avoid frictional contact with the surfaces 16, it being understood that FIG. 1 only shows a few representative inserts. The required density of the rollers 42 will be related generally to the sizes of the plates 20 to be transferred on the grid, and can be determined using principles commonly known to those of ordinary skill in the art to which this invention pertains. A greater number of inserts provides greater support and longer bearing life.

Referring to FIGS. 3 and 4, the insert length and width are selected to be slightly less than the corresponding pocket dimensions to be able to accommodate slight variances in pocket dimensions. In other words, the insert length and width are selected for the smallest expected opening size. The thickness or height of the body of the insert 40 is such that the lower surface 48 thereof is above the upper flange surface 32. For example, the body of insert 40 may have a length of perhaps about 15 inches, a width of perhaps about 2 inches, and a height of perhaps about 3 inches.

As seen in FIG. 3, the body of the insert 40 comprises a pair of parallel plate members 50 with a pair of members 52 sandwiched between and welded to the members 50 at the end portions thereof respectively as by welds 56. Alternatively, the insert body may be cast as a single piece or the members 50 and 52 bolted or screwed together, or the insert body may otherwise be suitably constructed. The combined thickness of plates 50 and a member 52 constitutes the width of the body of the insert 40. The members 52 are spaced from each other so as to leave a generally elongate central opening 54 between the members 52 and between the plates 50. The roller 42 is rotatably mounted by means of bushing 46 on an axle 58 which extends across the opening 54 and is mounted in apertures 60 in the plates 50 and secured thereto by means of a setscrew or cylindrical pin 62 threadedly received in a vertical threaded or cylindrical aperture 64 extending downwardly from the upper surface 66 of the body of the insert 40, i.e., the upper surface of a plate 50. Alternatively, bushings may be provided in the apertures 60 for rotation of the axle 58 with the roller 42 rigidly mounted thereon. More expensive heat resistant bushings may be required for cooling bed locations where the plates will be hotter, and less expensive bushings may be used in cooling bed locations where the plates will be cooler. Suitable bushings can be selected using principles commonly known to one of ordinary skill in the art to which this invention pertains. The plates 50 may be spaced, for example, a distance of perhaps about 1.2 inches to accommodate a roller 42 having a width of perhaps about 1.1 inch. The roller diameter may perhaps be between about 5 and 8 inches.

The insert 40 may be stabilized laterally by means of perhaps 4 setscrews 68 with two of the setscrews threadedly received in threaded apertures 70 which extend through the thickness of each of the plates 50 at opposite ends of opening 54, and the setscrews 68 are caused to protrude from the apertures 70 to engage the respective sides of the grid members 14 for mounting of the insert 40 in the pocket 38.

Each of the members 52 is provided with means for clampingly engaging the respective cross-member flange 30 so as to secure each end of the insert 40. Only one of the members 52 is described herein, it being understood that the other is identical thereto. A vertical threaded aperture 74 is provided vertically through the height of the member 52 for alignment with the upper surface 32 of the flange 30 when the insert 40 is mounted in the pocket 38. Inwardly (toward the opening 54) from the aperture 74 is provided an unthreaded vertical bore 76 which also extends through the height of the member 52 and in which is provided a counterbore 78 in the upper surface thereof.

A rotatable cylindrical elongate member 80 is received within the bore 76 and extends downwardly beyond the bore 76 and includes a head member 82 which is contained within the counterbore 78 and is manipulated by a wrench for rotating the member 80. The lower end portion 82 of member 80 (the portion extending downwardly beyond the lower surface 48 of the body of the insert 40) threadedly and coaxially engages cylindrical member 84 to which are rigidly attached at its upper end member 86 and to its lower end bracket 88. Bracket 88 is welded thereto as by welds 90 and comprises an elongate member one end of which is flush with the cylindrical surface of member 84 and the other end of which extends radially outwardly beyond member 84 a distance sufficient to engage the under surface 34 of the flange 30, as shown in FIG. 4. Alternatively, members 84, 86, and 88 may be cast as a single piece.

A pin 92 is securely received in an aperture 94 in the lower surface 48 of the member 52 at a position inwardly from bore 76 (towards the roller 42) and extends downwardly beyond the surface 48 and beyond the member 86. As shown in FIG. 3, member 86 has a first radius, illustrated at 96, over an arc of 180 degrees, this radius being insufficient in relation to the pin 92 to engage the pin 92. Member 86 has a second radius, illustrated at 98, over the remaining 180 degrees of arc which is greater than the radius 96 and which provides a shoulder 100 on diametrically opposite sides of the member 86 for engaging the pin 92. The pin 92 is thus positioned to be engaged by each of the shoulders 100 and thus acts as a stop to prevent rotation of members 84, 86, and 88 through more than about 180 degrees. Movement of member 86 through an arc of 180 degrees to a point where it is stopped by engagement of a shoulder 100 with the pin 92 also effects movement of bracket 88 through 180 degrees from one position, shown in FIG. 4, wherein the bracket 88 is positioned below the flange surface 34 to engage the flange to another point wherein the bracket 88 is rotated away from the flange for disengagement therewith. When the rotation of the member 86 as well as members 84 and 88 is stopped by engagement of the pin 92 by a shoulder 100, the rotatable member 80 may still be screwed into or out of member 84 whereby the distance between member 88 and the lower surface 48 of the insert may be adjusted for variances in flange size or other grid size variances.

Setscrews 103, threadedly contained in aperture 74, are used to adjust the distance 44, i.e., the height position between surfaces 16 and the engaging surface of roller 42. Members 84, 86, and 88 are then activated with member 88 engaging the flange lower surface 34 to pull setscrew 103 into tight contact with flange top surface 32 for tightly securing the insert in position. Simultaneously, the setscrews 68 are adjusted for lateral stability of the insert 40. Jam setscrew 102, also threadedly contained in aperture 74, is used to lock setscrew 103 in place. Setscrew 102 should of course be sized so as not to protrude from aperture 74 when the insert is installed.

Figure 5:
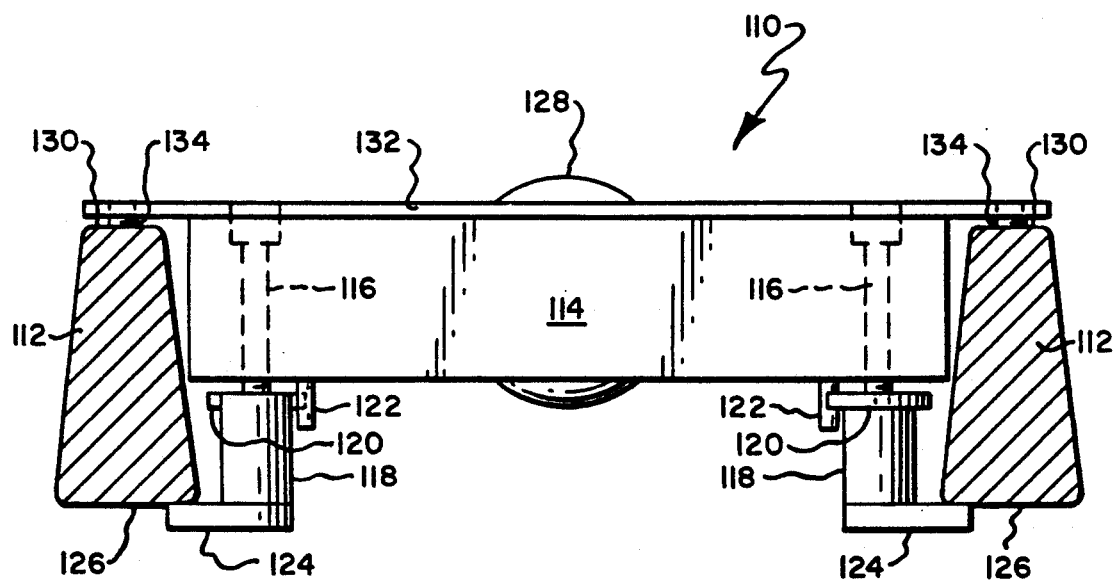
FIG. 5 is a side elevation view of an insert in accordance with an alternative embodiment of the present invention.

As previously discussed, some grids may not have flanged cross-members. Referring to FIG. 5, there is illustrated at 110 an alternative embodiment of the insert for use with grids having members (not shown) similar to members 14 and having unflanged cross-members 112. The insert 110 includes a body portion 114, rotary members 116, cylindrical members 118, stop members 120, pins 122, members 124 for engaging the lower surfaces 126 of cross-members 112, and rollers 128 similar to the body of insert 40, rotary members 80, cylindrical members 84, stop members 86, pins 92, members 88, and rollers 42 respectively of inserts 40 and including setscrews (not shown) similar to setscrews 68 for inserts 40. In order to clamp the insert 110 between the lower and upper surfaces 126 and 130 respectively of cross-members 112, a plate member 132 is welded or bolted or otherwise suitably attached to the upper surface of the body portion 114 to extend over the length thereof and beyond the ends thereof and sized to overlie the cross-members 112. Setscrews 134 contained in threaded apertures through the thickness of the plate member 132 are provided in locations to be in alignment with surfaces 130 to provide clamping engagement of the cross-members 112 between setscrews 134 and members 124 similarly as provided by setscrews 103 and members 88 for the inserts 40. A jam screw (not depicted) similar to jam screw 102 may also be provided, and the insert 110 may otherwise be similar to the insert 40.

The inserts 40 may be quickly, easily, and inexpensively retrofitted to existing grids to reduce wear thereof whereby the grids need not be replaced at great expense as often as well as to prevent marring of the metal plates 20 for a higher quality product. This may be achieved, with respect to the embodiment of FIGS. 1 to 4, by merely positioning the inserts 40 in the pockets 38, screwing the setscrews 103 downwardly to engage the upper flange surfaces 32 and achieve the desired distance 44, then engaging the flange lower surfaces 34 with the brackets 88 and manipulating rotatable members 80 to clampingly engage the flanges 30 while simultaneously adjusting the lateral positioning of the insert 40 by means of setscrews 68. Once the insert position both vertically and laterally is suitably achieved, then the setscrews 68 may be tightened and jam setscrews 102 applied to lock the positions of setscrews 103. The insert is then ready for use with the plates 20 engaging the surfaces of the rollers 42 to reduce or eliminate sliding friction between the plates 20 and the upper grid member surfaces 16 so that the grid 10 may be longer lasting while also preventing marring of the plates 20 for a higher quality product. Retrofitting of inserts 110 may be similarly achieved. The retrofitted grid 10 may be inexpensively maintained by merely removing and replacing inserts as needed without the requirement of replacing an entire grid. The inserts may also allow increased chain life and lower power consumption due to decreased friction and an increased plate cooling rate due to decreased contact with hot grates, the tendency of the grates as a result to stay cooler, and increased air circulation. The ease and inexpense with which the inserts may be installed and replaced may also allow a new grid with such inserts to be competitive with existing cooling bed arrangements.

It should be understood that while the invention has been described in detail herein, the invention can be embodied otherwise without departing from the principles thereof, and such other embodiments are meant to come within the scope of the present invention as defined by the appended claims.

What is claimed is:

1. An insert for a cooling bed plate transfer grid having a plurality of elongate parallel first members and a plurality of elongate second members extending crosswise to the first members for support thereof and defining therewith a plurality of pockets, the insert comprising roller means and means for supporting said roller means in one of the pockets to project above the first and second members for engaging plates as they are moved along the grid, wherein the second members have lower flanges, the insert having a pair of end portions and including means for clamping the insert at said end portions to respective second member flanges.

2. An insert according to claim 1 wherein said clamping means comprises bracket means, means for effecting engagement of said bracket means beneath a lower surface of a respective lower flange, and screw means for engaging an upper surface of the respective lower flange to adjust the distance which said roller means projects above the first and second members whereby the insert may be adjustably clamped to the respective lower flanges.

3. An insert according to claim 2 further comprising a rotatable member attached to said bracket means for effecting movement of said bracket means to a position to engage a lower surface of the respective lower flange.

4. An insert according to claim 3 further comprising bore means in the insert for receiving said rotatable member including counterbore means in the upper surface of the insert for receiving a head of said rotatable member whereby the rotatable member may be manipulated from above the insert for effecting engagement beneath a lower surface of the respective lower flange by said bracket means.

5. An insert according to claim 2 further comprising aperture means in an upper surface of the insert and extending through the height of the insert for threadedly receiving said screw means whereby said screw means may be manipulated from above the insert for engaging an upper surface of the respective lower flange.

6. An insert according to claim 2 further comprising stop means for limiting rotational movement of said bracket means between a first position beneath a lower surface of the respective lower flange and a second position wherein said bracket means is not beneath a lower surface of the respective lower flange.

7. An insert according to claim 6 further comprising means for adjusting the height of said bracket means relative to the insert.

8. An insert according to claim 2 further comprising means for adjusting the height of said bracket means relative to the insert.

9. An insert according to claim 8 wherein said height adjusting means comprises a rotatable member threadedly connected to said bracket means for effecting movement of said bracket means to a position to engage a lower surface of the respective lower flange and for screwing said rotatable member relative to said bracket means.

10. An insert for a cooling bed plate transfer grid having a plurality of elongate parallel first members and a plurality of elongate second members extending cross-wise to the first members for support thereof and defining therewith a plurality of pockets, the insert comprising roller means and means for supporting said roller means in one of the pockets to project above the first and second members for engaging plates as they are moved along the grid, wherein said support means comprises a pair of plates having end portions, a member sandwiched between and rigidly attached to said plates at respectively opposite ones of said end portions to define an opening between said plates and said sandwiched members, said roller means comprising axis means extending across the opening and mounted in said plates and a roller in the opening and mounted on said axis means.

11. A plate transfer grid for a cooling bed comprising a plurality of elongate parallel first members, a plurality of elongate second members extending cross-wise to said first members and defining therewith a plurality of pockets, at least one insert removably and replaceably mounted in one of said pockets, said insert comprising roller means and means for supporting said roller means in one of the pockets to project above the first and second members for engaging plates as they are moved along the grid, wherein the second members have lower flanges, the insert having a pair of end portions and including means for clamping the insert at said end portions to respective second member flanges.

12. A plate transfer grid for a cooling bed comprising a plurality of elongate parallel first members, a plurality of elongate second members extending cross-wise to said first members and defining therewith a plurality of pockets, at least one insert removably and replaceably mounted in one of said pockets, said insert comprising roller means and means for supporting said roller means in one of the pockets to project above the first and second members for engaging plates as they are moved along the grid, wherein said insert includes a pair of portions which overlie said second members and means for clamping said insert at said pair of portions to said respective second members.

13. A method for fitting a cooling bed plate transfer grid having a plurality of elongate parallel first members and a plurality of elongate second members extending cross-wise to the first members and defining therewith a plurality of pockets, the method comprising removably and replaceably mounting in at least one of the pockets an insert having a roller projecting above the first and second members for engaging plates as they are moved along the grid and further comprising clamping each end portion of the insert to the lower flange of a respective one of the second members.

* * * * *